US011919016B2

(12) United States Patent
Ma et al.

(10) Patent No.: US 11,919,016 B2
(45) Date of Patent: Mar. 5, 2024

(54) DISCHARGING CONTAINER

(71) Applicant: Kao Corporation, Tokyo (JP)

(72) Inventors: Shiqing Ma, Shanghai (CN); Yadong Xia, Shanghai (CN); Chanjia He, Shanghai (CN); Beibei Zhu, Shanghai (CN)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 17/630,411

(22) PCT Filed: Aug. 28, 2020

(86) PCT No.: PCT/IB2020/058029
§ 371 (c)(1),
(2) Date: Jan. 26, 2022

(87) PCT Pub. No.: WO2021/038499
PCT Pub. Date: Mar. 4, 2021

(65) Prior Publication Data

US 2022/0280962 A1 Sep. 8, 2022

(30) Foreign Application Priority Data

Aug. 30, 2019 (CN) ......................... 201910812186.3

(51) Int. Cl.
*B05B 11/00* (2023.01)
*A47K 5/12* (2006.01)
(Continued)

(52) U.S. Cl.
CPC ........ *B05B 11/1047* (2023.01); *A47K 5/1205* (2013.01); *A47K 5/14* (2013.01); *B01F 23/235* (2022.01); *B01F 2101/4505* (2022.01)

(58) Field of Classification Search
CPC ............. B05B 11/1047; B05B 11/1023; B05B 11/1087; B05B 11/0089; B05B 11/1067;
(Continued)

(56) References Cited

U.S. PATENT DOCUMENTS

2009/0314805 A1 12/2009 Ding
2010/0126522 A1* 5/2010 Fujinuma .............. A61K 8/415 132/208

(Continued)

FOREIGN PATENT DOCUMENTS

CN 1195743 A 10/1998
CN 101184558 A 5/2008

(Continued)

OTHER PUBLICATIONS

International Search Report dated Dec. 8, 2020 in PCT/IB2020/058029 filed on Aug. 28, 2020, 2 pages.

*Primary Examiner* — Vishal Pancholi
(74) *Attorney, Agent, or Firm* — Oblon, McClelland, Maier & Neustadt, L.L.P.

(57) ABSTRACT

A discharging container comprising a container body that stores a content and a discharging component that discharges the content. The discharging component comprises a cover portion mounted to a mouth neck portion of the container body and a pump head portion that discharges the content by a pressing operation. A tubular guide rod is erected upwards from the periphery of an opening formed in the central portion of a top plate of the cover portion. The pump head portion is provided with an inner waterproof wall capable of moving up and down along the outer peripheral surface of the guide rod, and a first outer waterproof wall located at the outer side of the inner waterproof wall. The discharging container is easy to be manufactured and can reliably prevent water intrusion.

19 Claims, 13 Drawing Sheets

(51) Int. Cl.

| | |
|---|---|
| ***A47K 5/14*** | (2006.01) |
| ***B01F 23/235*** | (2022.01) |
| ***B05B 11/10*** | (2023.01) |
| *B01F 101/00* | (2022.01) |

(58) Field of Classification Search

CPC ............ B05B 11/1001; B05B 11/1042; A47K 5/1205; A47K 5/14; B01F 23/235; B01F 2101/4505

See application file for complete search history.

(56) References Cited

U.S. PATENT DOCUMENTS

| | | | | |
|---|---|---|---|---|
| 2013/0048755 | A1* | 2/2013 | Uehira ................ | B05B 11/1087 239/318 |
| 2019/0001357 | A1* | 1/2019 | Uchiyama ........... | B05B 11/1056 |
| 2019/0191936 | A1* | 6/2019 | Aoyama .................. | A47K 5/16 |

FOREIGN PATENT DOCUMENTS

| | | | |
|---|---|---|---|
| CN | 101668509 | A | 3/2010 |
| CN | 102822069 | A | 12/2012 |
| JP | 2001-19014 | A | 1/2001 |
| JP | 2007-275777 | A | 10/2007 |
| JP | 2011-148535 | A | 8/2011 |
| JP | 2015-143128 | A | 8/2015 |

* cited by examiner

DISCHARGING CONTAINER

FIELD

The present invention relates to a discharging container.

BACKGROUND

Conventionally, a discharging container including a container body that stores a content and a discharging component that discharges the stored content by a pressing operation has been developed. In such a discharging container, when the pressing is released after the pump head portion of the discharging component is pressed to discharge the content, with the rise of the pump head portion, the pressure of the external air is greater than the pressure in the pump head portion, and when it is used in, for example, a bathroom, water is directly applied to the discharging container during the shower and the water is accumulated in the fitting portion of the pump head portion and the cover portion mounted to the mouth neck portion of the container body, and there is a problem that the water accumulated in the fitting portion intrudes into the container body and/or the discharging component together with the external air through the gap between the pump head portion and the cover portion. In addition, there is also a problem that the risk of bacterial contamination and odor generation is increased due to the long-term retention of water invading into the container body and/or the discharging component.

In order to solve the above problems, for example, in the foam discharging container described in Patent Document 1, in the skirt-shaped cover, an external air intake port is separately formed from the gap between the skirt-shaped cover and the outer peripheral surface of the guide rod that can allow the invasion of the external air. Therefore, even in an environment where a large amount of water is easy to contact the periphery of the pump head portion, it is possible to effectively prevent the water and external air from being sucked into the cylinder portion and introduced into the air chamber when the pressing of the pump head portion is released.

In addition, in the pump type foam discharging container described in Patent Document 2, at the opposite side of the discharge port of the nozzle body, a suction port for sucking the external air is opened on the outer wall of the recess, and the space more inboard than the recess is communicated with the ventilation path between the inner cylinder portion and the outer cylinder portion, the skirt-like cover portion hanging downward from the outer edge portion of the top of the nozzle body is formed to be separated from the recessed portion at the outside and extend to a position lower than the suction port. Therefore, it is possible to reliably prevent the water from being invaded into the suction port that can introduce a large amount of external air.

However, in the foam discharging container described in Patent Document 1, it is difficult to demold the external air intake port from the mold during molding. Therefore, it is also difficult to manufacture the foam discharging container described in Patent Document 1. In the foam discharging container described in Patent Document 2, the pump head has a separate structure in order to easily demold the suction port from the mold during molding. Therefore, the manufacturing process is complicated.

CITATION LIST

Patent Document 1: JPA2007-275777
Patent Document 2: CN102822069A

SUMMARY

In view of the above-mentioned situation, the present invention aims to provide a discharging container that is easy to be manufactured and can reliably prevent water intrusion.

In order to achieve the above-mentioned object, a discharging container according to an aspect of the present invention comprising: a container body for storing a content and a discharging component for discharging the content. The discharging component comprises a cover portion mounted to a mouth neck portion of the container body and a pump head portion configured to discharge the content by a pressing operation. A tubular guide rod is erected upwards from a periphery of a fourth opening formed in a central portion of a top plate of the cover portion. The pump head portion is provided with an inner waterproof wall which can move up and down along an outer peripheral surface of the guide rod, and a first outer waterproof wall located at the outside of the inner waterproof wall. In a state that the pump head portion is pressed, the inner waterproof wall is opposed to the guide rod, a space between the inner waterproof wall and the guide rod is communicated with a space between the inner waterproof wall and the first outer waterproof wall via a first opening formed in the inner waterproof wall, and a space between the inner waterproof wall and the first outer waterproof wall is communicated with external air via a second opening formed in the first outer waterproof wall and/or a third opening formed in a top wall of the pump head portion.

In the discharging container according to one aspect of the present invention, it is preferable that a lower end edge of the inner waterproof wall and a lower end edge of the first outer waterproof wall are both located at the same position as the position of an upper end edge of the guide rod in a height direction of the discharging container or below the position of an upper end edge of the guide rod in a height direction of the discharging container.

In the discharging container according to one aspect of the present invention, it is preferable that at least any one of the first opening, the second opening, and the third opening is formed with two or more.

In the discharging container according to one aspect of the present invention, it is preferable that, when viewed along the height direction of the discharging container, the first opening and the second opening and/or the third opening do not overlap each other in a circumferential direction, respectively.

In the discharging container according to one aspect of the present invention, it is preferable that the first opening is formed to extend upwards from the lower end edge of the inner waterproof wall. In addition, in the discharging container according to one aspect of the present invention, it is preferable that the first opening has an elongated shape.

In the discharging container according to one aspect of the present invention, it is preferable that the second opening is formed to extend upwards from the lower end edge of the first outer waterproof wall. In addition, in the discharging container according to one aspect of the present invention, it is preferable that the second opening has an elongated shape.

In the discharging container according to one aspect of the present invention, it is preferable that the third opening is formed into an arc shape when viewed along the height direction of the discharging container.

In the discharging container according to one aspect of the present invention, it is preferable that a convex first baffle is arranged on an outer peripheral surface of the inner waterproof wall, and a convex second baffle is arranged on an inner peripheral surface of the first outer waterproof wall.

In the discharging container according to one aspect of the present invention, it is preferable that the content is a liquid agent, and the discharging container is a foam discharging container that mixes the liquid agent with air to discharge the foamy liquid agent.

According to the discharging container according to one aspect of the present invention, it is possible to provide a discharging container that is easy to be manufactured and can reliably prevent water intrusion.

DETAILED DESCRIPTION OF THE EMBODIMENT(S)

Hereinafter, preferred embodiments of the present invention will be described in detail with reference to the accompanying drawings. In addition, in the various drawings, the same or corresponding parts are designated by the same symbols, and the overlapping explanation will be omitted. In addition, in the various drawings, the height direction of the discharging container is referred to as a Z-axis direction, the direction of the discharge port of the pump head is referred to as an X-axis direction, and the direction perpendicular to the X-axis direction and the Z-axis direction is referred to as a Y-axis direction.

First Embodiment

Figure 1:
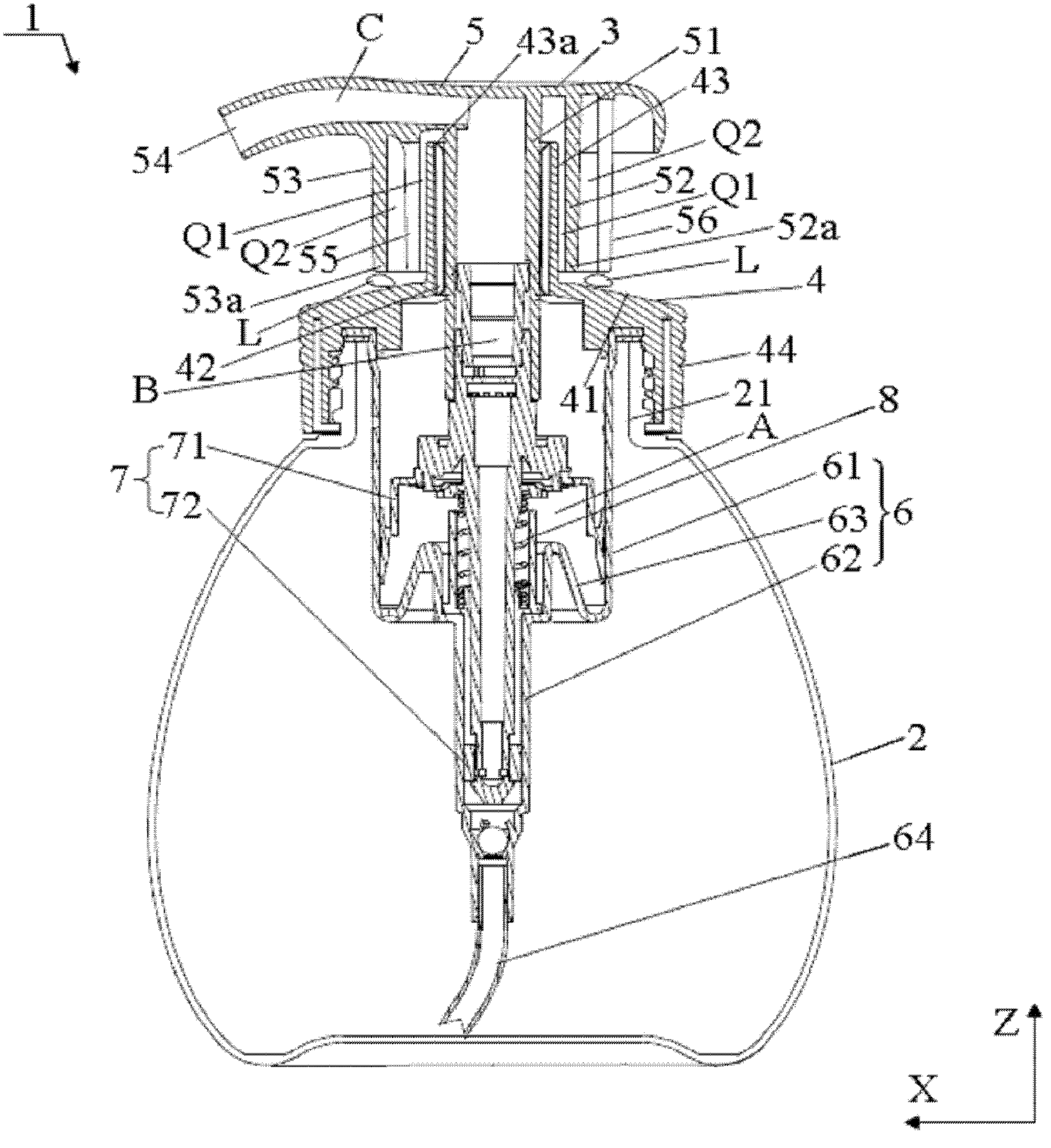
FIG. 1 is a cross-sectional view showing a schematic configuration of a discharging container according to a first embodiment at the time of pressing.
Figure 2:
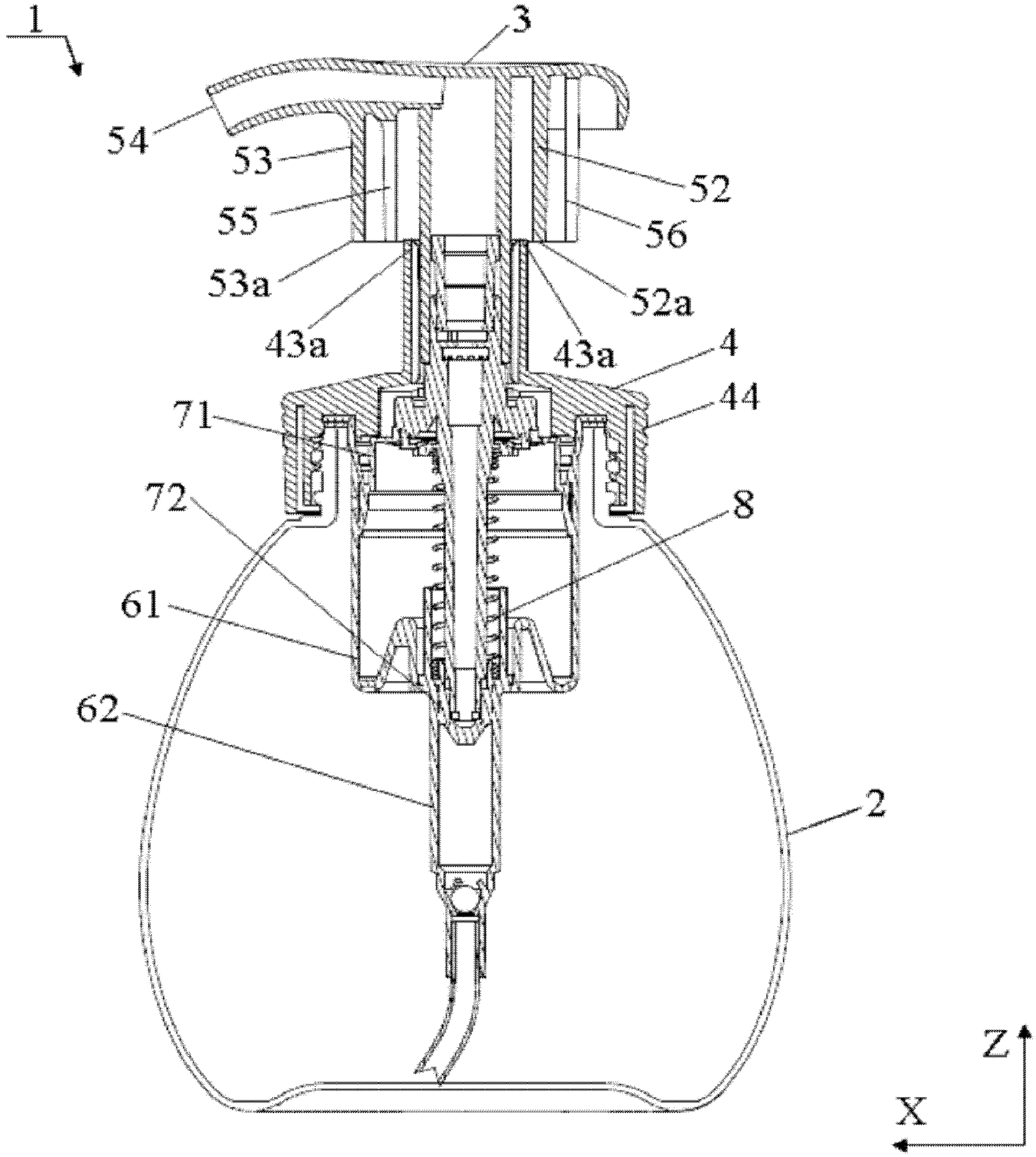
FIG. 2 is a cross-sectional view showing a schematic configuration of the discharging container according to the first embodiment when the pressing is released.
Figure 3:
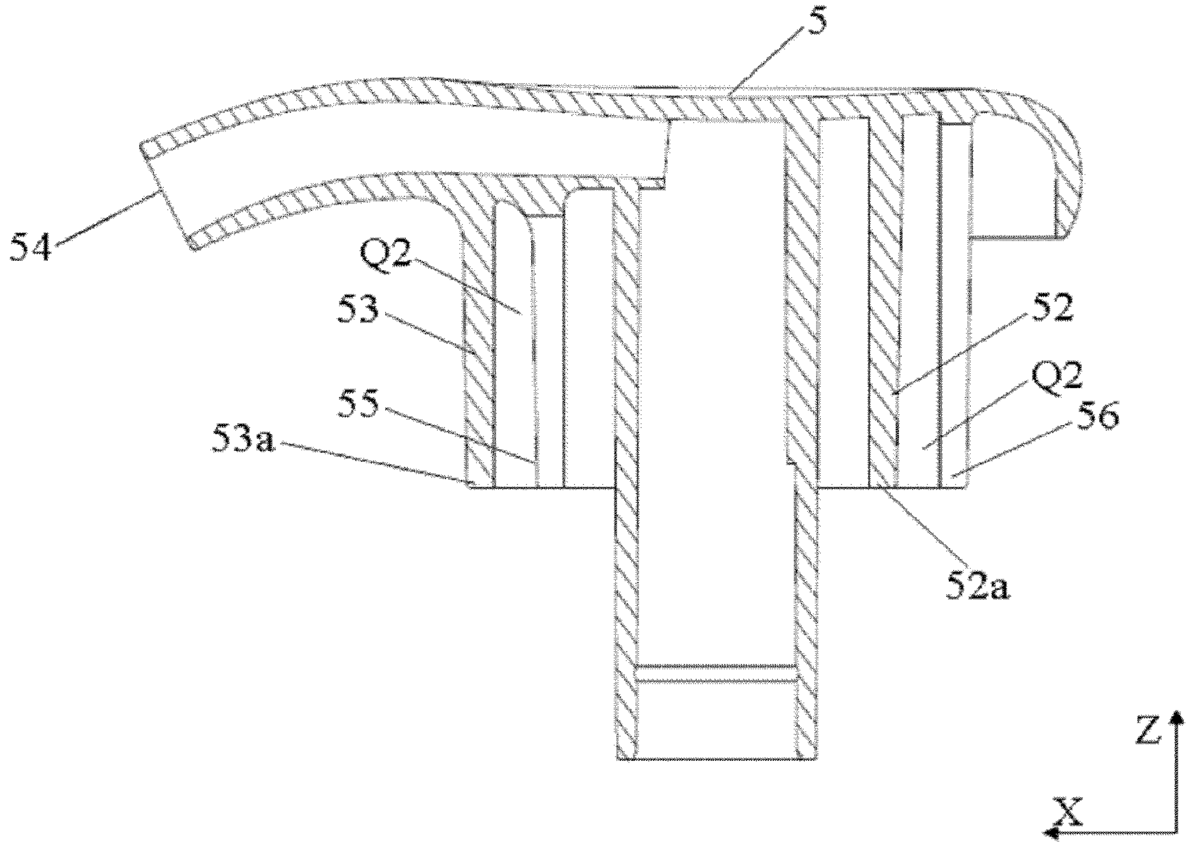
FIG. 3 is a cross-sectional view showing a schematic configuration of a pump head portion of the discharging container according to the first embodiment.
Figure 4:
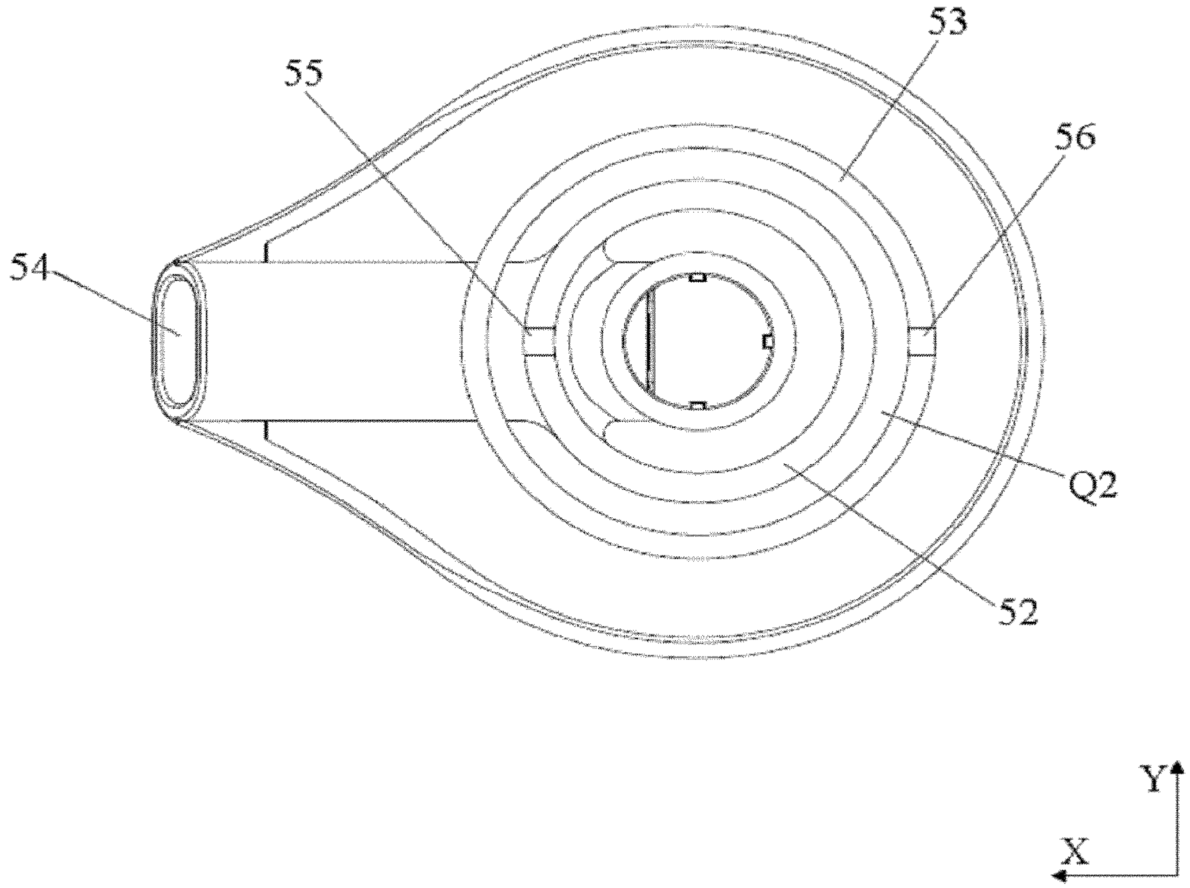
FIG. 4 is a bottom view showing a schematic configuration of the pump head portion of the discharging container according to the first embodiment.
Figure 5:
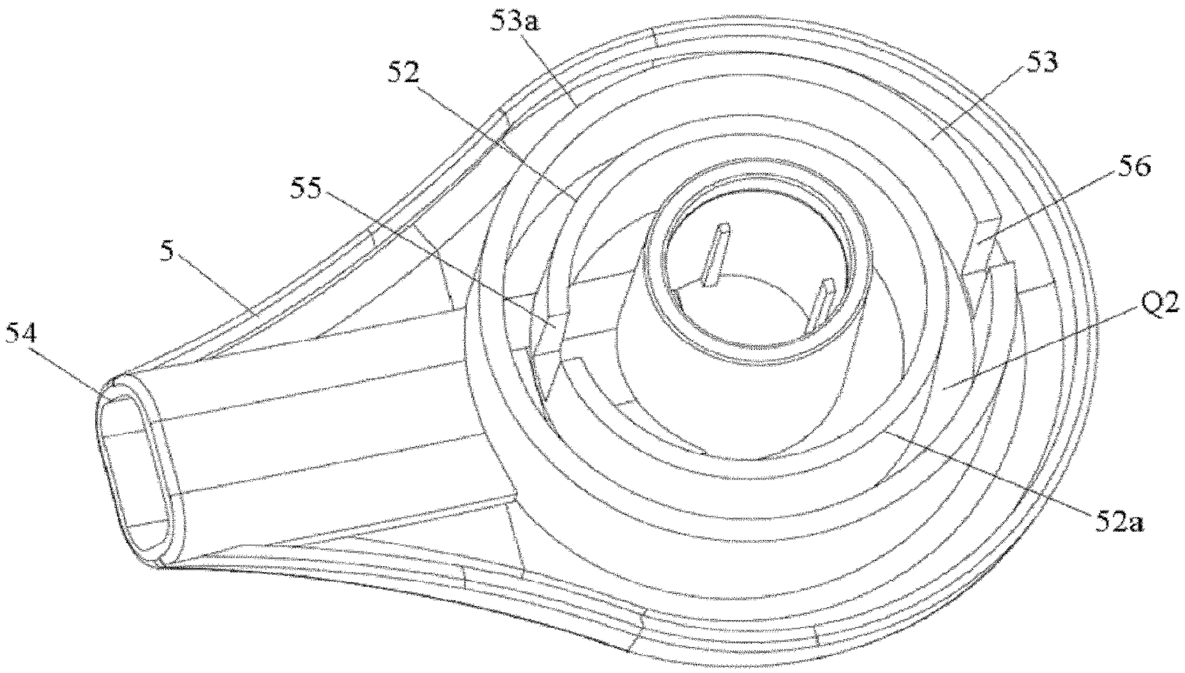
FIG. 5 is a perspective view showing a schematic configuration of the pump head portion of the discharging container according to the first embodiment.

FIG. 1 is a cross-sectional view showing a schematic configuration of a discharging container according to a first embodiment at the time of pressing. FIG. 2 is a cross-sectional view showing a schematic configuration of the discharging container according to the first embodiment when the pressing is released. FIG. 3 is a cross-sectional view showing a schematic configuration of a pump head of the discharging container according to the first embodiment. FIG. 4 is a bottom view showing a schematic configuration of the pump head of the discharging container according to the first embodiment. FIG. 5 is a perspective view showing a schematic configuration of the pump head of the discharging container according to the first embodiment.

As shown in FIGS. 1 and 2, discharging container 1 according to the present embodiment is a foam discharging container that mixes a content which is as a liquid agent with air to discharge a foamy liquid agent, and comprises container body 2 storing the content and discharging component 3 mounted to container body 2.

In the present embodiment, liquid detergent compositions, shampoos, hand soaps, bath gels, facial cleansers, hair conditioners, hairdressing agents, shaving agents, bath bowl cleaners, and the like can be cited as the liquid agent.

Discharging component 3 comprises cover portion 4 mounted to mouth neck portion 21 of container body 2, pump head portion 5 provided with discharge port 54 for discharging the content by a pressing operation, cylinder portion 6 that is provided downwardly from mouth neck portion 21 of container body 2 towards the inside, and piston portion 7 that is freely movable along the Z-axis direction inside cylinder portion 6.

Cover portion 4 has cylindrical mounting portion 44, and mounting portion 44 is capable of attaching the entire discharging component 3 to container body 2 by screwing with the above neck portion 21 or the like. Mounting portion 44 may be formed into a double-layered tube structure. In this case, the tube at the inner side of mounting portion 44 is screwed to mouth neck portion 21 or the like. Furthermore, there are top plate 41 for closing the upper end portion of mounting portion 44 of cover portion 4 and tubular guide rod 43 erected upwards from the periphery of fourth opening 42 opened in the central portion of top plate 41.

Pump head portion 5 has tubular inner tube portion 51 connected to the upper end portion of piston portion 7 and forming discharge passage C at the inner side, and discharge port 54 that is communicated with discharge passage C and discharges the liquid agent. Inner tube portion 51 is inserted into guide rod 43 of cover portion 4. In addition, the pump head portion has tubular inner waterproof wall 52 that is located at the outside of inner tube portion 51 and can move up and down (that can move back and forth in the Z-axis direction) along the outer peripheral surface of guide rod 43 of cover portion 4, and tubular first outer waterproof wall 53 that is located at the outside of inner waterproof wall 52 and can move up and down (that can move back and forth in the Z-axis direction) together with inner waterproof wall 52. Inner tube portion 51, inner waterproof wall 52, and first outer waterproof wall 53 are formed coaxially. In the present embodiment, inner tube portion 51, inner waterproof wall 52, and first outer waterproof wall 53 are integrally formed in pump head portion 5. However, it is not limited to this, and inner tube portion 51, inner waterproof wall 52, and first outer waterproof wall 53 may be separately formed in pump head portion 5, respectively.

Cylinder portion 6 is formed by coaxially connecting large-diameter tubular air cylinder 61 and small-diameter tubular liquid agent cylinder 62 through connecting portion 63. A funnel-shaped valve seat portion is formed at the lower end of liquid agent cylinder 62. Liquid guiding pipe 64 for guiding the content contained in container body 2 into the hollow liquid agent cylinder 62 is connected below the valve seat portion. In addition, cylinder portion 6 has mixing chamber B that mixes the liquid agent and air, and mixing chamber B is equipped with a mesh for generating the foamed liquid agent.

Piston portion 7 includes air piston 71 slidable along the inner surface of air cylinder 61 and liquid agent piston 72 slidable along the inner surface of liquid agent cylinder 62. At the lower end of air piston 71, a sealing portion having a predetermined width is formed so as to ensure sufficient airtightness with the inner surface of air cylinder 61 and to smoothly slide in the vertical direction with respect to the inner surface. In addition, at the lower end of liquid agent piston 72, a sealing portion having a predetermined width is formed so as to ensure sufficient airtightness with the inner surface of liquid agent cylinder 62 and to smoothly slide in the vertical direction with respect to the inner surface.

With cylinder portion 6 and piston portion 7 having such a structure, air chamber A is formed at the inside of air cylinder 61 covered by air piston 71 and at the outside of liquid agent piston 72.

In this way, by pressing pump head portion 5, air piston 71 slides downward in conjunction with the downward movement of pump head portion 5 to resist the force of spring 8, so that air chamber A is pressurized, and air is supplied from air chamber A to mixing chamber B through the air passage. At the same time, liquid agent piston 72 slides downward in conjunction with the downward movement of pump head portion 5 to resist the force of spring 8, so that the content which is as a liquid agent contained in liquid agent cylinder 62 is pressurized and is supplied to mixing chamber B. As a result, the content supplied from liquid agent cylinder 62 and the air supplied from air chamber A are mixed in mixing chamber B to generate a foamy liquid agent, and the generated foamy liquid agent is discharged from discharge port 54 through discharge passage C inside pump head portion 5.

In addition, by releasing the pressing to pump head portion 5, air piston 71 and liquid piston 72 slide upward by the force of spring 8 and return to their initial positions (see FIG. 2).

In addition, in the present embodiment, as shown in FIG. 1, in a state where pump head portion 5 is pressed (located at the bottom portion), inner waterproof wall 52 is opposed to guide rod 43, and space Q1 between inner waterproof wall 52 and guide rod 43 is communicated with space Q2 between inner waterproof wall 52 and first outer waterproof wall 53 via first opening 55 formed in inner waterproof wall 52, space Q2 between inner waterproof wall 52 and first outer waterproof wall 53 is communicated with the external air via second opening 56 formed in first outer waterproof wall 53. As for the size of first opening 55, the width of first opening 55 in the Y-axis direction is preferably 1% to 50% of the diameter of inner waterproof wall 52, more preferably 2% to 35% of the diameter of inner waterproof wall 52, and still more preferably 3% to 20% of the diameter of inner waterproof wall 52. The length of first opening 55 in the Z-axis direction is preferably 5% to 100% of the height of inner waterproof wall 52, more preferably 50% to 100% of the height of inner waterproof wall 52, and still more preferably 70% to 100% of the height of inner waterproof wall 52. As for the size of second opening 56, the width of second opening 56 in the Y-axis direction is preferably 1% to 50% of the diameter of first outer waterproof wall 53, more preferably 2% to 35% of the diameter of first outer waterproof wall 53, and still more preferably 3% to 20% of the diameter of first outer waterproof wall 53. The length of second opening 56 in the Z-axis direction is preferably 5% to 100% of the height of first outer waterproof wall 53, more preferably 50% to 100% of the height of first outer waterproof wall 53, and still more preferably 70% to 100% of the height of first outer waterproof wall 53.

Thus, the air pressure in spaces Q1, Q2 of pump head portion 5 is equal to that of the external air. Therefore, when the pressing is released after pump head portion 5 of discharging component 3 is pressed to discharge the content, with the rise of pump head portion 5, the air pressure of the external air will not be greater than the air pressure in spaces Q1, Q2 of pump head portion 5. Even when it is used in, for example, a bathroom, water is directly applied to discharging container 1 during the shower and water L is accumulated in the fitting portion of pump head portion 5 and cover portion 4, which can prevent water L accumulated in the fitting portion and the external air from entering container body 2 through the gap between pump head portion 5 and guide rod 43 of cover portion 4. In addition, pump head portion 5 is provided with a two-layer waterproof wall consisting of inner waterproof wall 52 and first outer waterproof wall 53, in addition, inner waterproof wall 52 and first outer waterproof wall 53 are respectively provided with first opening 55 and second opening 56 extending upwards from lower end edges 52*a*, 53*a*. Therefore, it is not difficult to demold the external air intake port from the mold during molding as in Patent Document 1, and it becomes easy to be manufactured the discharging container.

In addition, in the present embodiment, as shown in FIG. 2, it is exemplified that in the state where pump head portion 5 is in the uppermost position without being pressed, lower end edge 52*a* of inner waterproof wall 52 and lower end edge 53*a* of first outer waterproof wall 53 are both located at the same position as the position of upper end edge 43*a* of guide rod 43 in the height direction (Z-axis direction) of discharging container 1. However, it is not limited to this. Lower end edge 52*a* of inner waterproof wall 52 and lower end edge 53*a* of first outer waterproof wall 53 may both be located below the position of upper end edge 43*a* of guide rod 43 in the height direction (Z-axis direction) of discharging container 1. Thereby, it is possible to prevent water from intruding into container body 2 through the gap between lower end edge 52*a* of inner waterproof wall 52 and lower end edge 53*a* of first outer waterproof wall 53 and upper end edge 43*a* of guide rod 43.

In addition, in the present embodiment, as shown in FIG. 4, when viewed along the Z-axis direction, the central axis of first opening 55 and the central axis of second opening 56 are offset from each other by 180° along the circumferential direction. More specifically, first opening 55 is formed at the side of discharge port 54 viewed from the center of inner waterproof wall 52, and second opening 56 is formed at the opposite side of discharge port 54 viewed from the center of first outer waterproof wall 53. As a result, the air pressure inside and outside is balanced, and water cannot penetrate into it. At the same time, when viewed along the Z-axis direction, first opening 55 and second opening 56 do not overlap with each other in the circumferential direction, preventing the risk of water intrusion from the overlapped opening portion. However, it is not limited to this, first opening 55 and second opening 56 may also be offset by any angle, as long as first opening 55 and second opening 56 do not overlap each other in the circumferential direction. For example, the central axis of first opening 55 and the central axis of second opening 56 may be offset from each other by 45°, 90°, or 120° in the circumferential direction.

In addition, in the present embodiment, as shown in FIG. 5, first opening 55 is formed to extend upwards from lower end edge 52*a* of inner waterproof wall 52. In addition, first opening 55 has an elongated shape. Thus, it becomes easy to demold first opening 55 from the mold during molding. However, it is not limited to this, as long as it is easy to demold first opening 55 from the mold during molding, first opening 55 may have any shape.

In addition, in the present embodiment, as shown in FIG. 5, second opening 56 is formed to extend upwards from lower end edge 53*a* of first outer waterproof wall 53. In addition, second opening 56 has an elongated shape. Thus, it becomes easy to demold second opening 56 from the mold during molding. However, it is not limited to this, as long as it is easy to demold second opening 56 from the mold during molding, second opening 56 may have any shape.

According to discharging container 1 according to the present embodiment, it is possible to provide a discharging container that is easy to be manufactured and can reliably prevent water intrusion.

Second Embodiment

Figure 6:
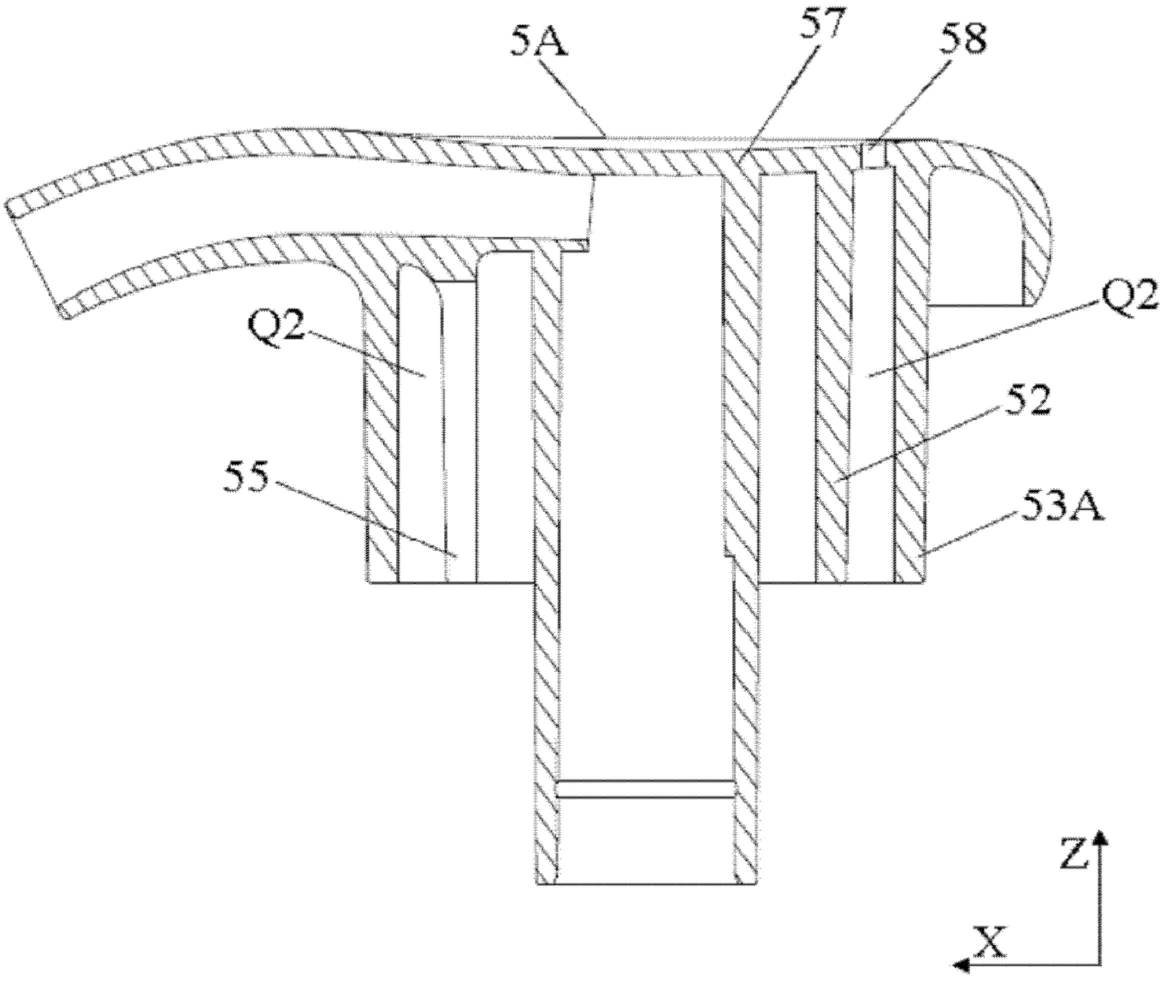
FIG. 6 is a cross-sectional view showing a schematic configuration of a pump head portion of a discharging container according to a second embodiment.
Figure 7:
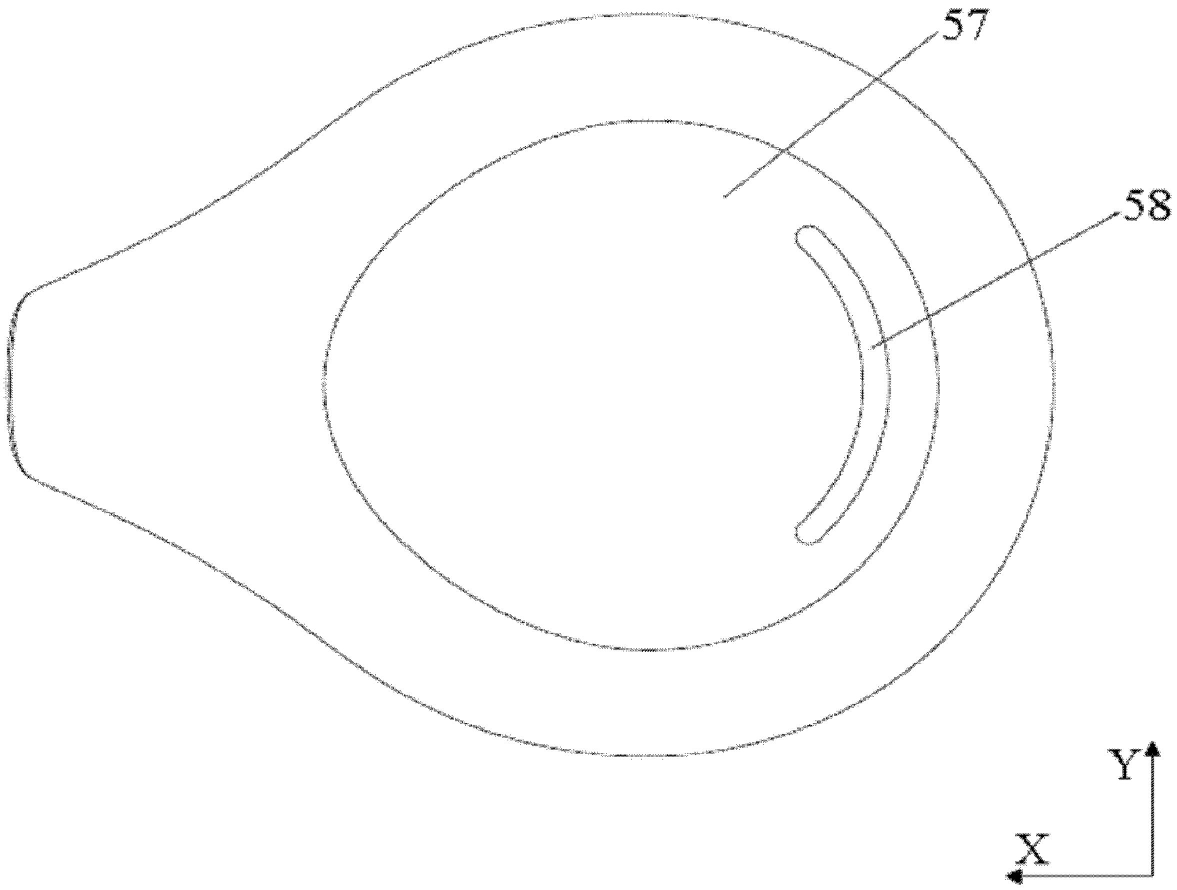
FIG. 7 is a top view showing a schematic configuration of the pump head portion of the discharging container according to the second embodiment.
Figure 8:
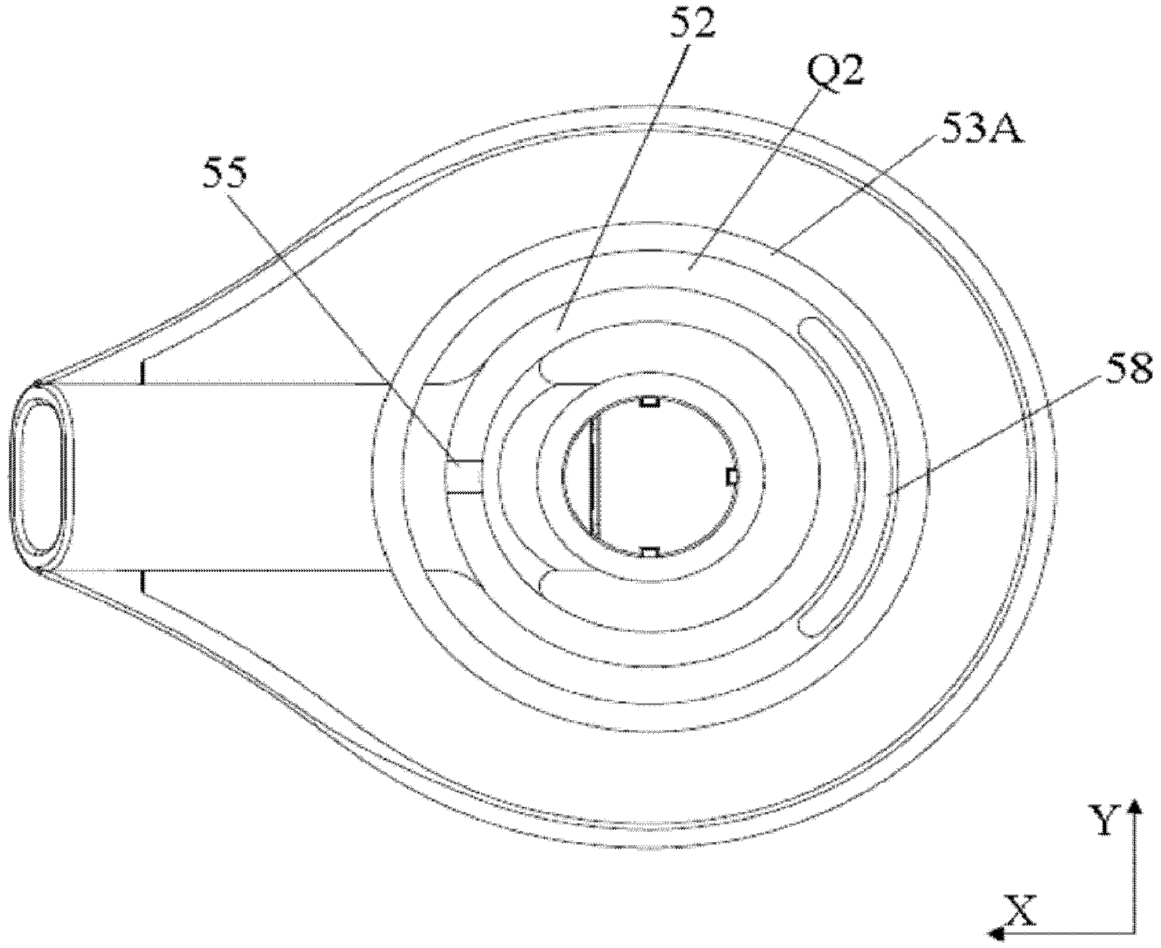
FIG. 8 is a bottom view showing a schematic configuration of the pump head portion of the discharging container according to the second embodiment.

FIG. 6 is a cross-sectional view showing a schematic configuration of a pump head portion of a discharging container according to a second embodiment. FIG. 7 is a top view showing a schematic configuration of the pump head portion of the discharging container according to the second embodiment. FIG. 8 is a bottom view showing a schematic configuration of the pump head portion of the discharging container according to the second embodiment.

The discharging container according to the present embodiment is substantially the same as the discharging container according to the first embodiment except that it includes pump head portion 5A instead of pump head portion 5 as shown in FIGS. 6 to 8. Therefore, in the following, the differences from the discharging container according to the first embodiment will be mainly explained in detail.

Specifically, in the present embodiment, pump head portion 5A is provided with tubular inner tube portion 51 connected to the upper end portion of piston portion 7 and forming discharge passage C at the inside, tubular inner waterproof wall 52 that can move up and down (that can move back and forth in the Z-axis direction) along the outer peripheral surface of guide rod 43 and tubular first outer waterproof wall 53A located at the outside of inner waterproof wall 52. Third opening 58 is arranged in top wall 57 of pump head portion 5A in such a way that space Q2 between inner waterproof wall 52 and first outer waterproof wall 53A is communicated with the external air.

In this way, in a state where pump head portion 5A is pressed (located at the bottom portion), inner waterproof wall 52 is opposed to guide rod 43, and space Q1 between inner waterproof wall 52 and guide rod 43 is communicated with space Q2 between inner waterproof wall 52 and first outer waterproof wall 53A via first opening 55 formed in inner waterproof wall 52, which is the same as the first embodiment.

In addition, unlike the first embodiment, space Q2 between inner waterproof wall 52 and first outer waterproof wall 53A is communicated with external air via third opening 58 formed in top wall 57 of first outer waterproof wall 53A at a position that is in contact with space Q2 between inner waterproof wall 52 and first outer waterproof wall 53A.

In addition, in the present embodiment, as shown in FIG. 7, when viewed along the Z-axis direction, third opening 58 is formed into an arc shape. More specifically, when viewed along the Z-axis direction, third opening 58 is formed into an arc shape along space Q2 formed in a ring shape. However, it is not limited to this, and as long as it is easy to demold third opening 58 from the mold during molding, third opening 58 may have any shape.

In addition, in the present embodiment, as shown in FIG. 8, when viewed along the Z-axis direction, the central axis of first opening 55 and the central axis of third opening 58 are offset from each other by 180° along the circumferential direction. However, it is not limited to this, the central axis of first opening 55 and the central axis of third opening 58 may also be offset by any angle, as long as the central axis of first opening 55 and the central axis of third opening 58 are offset from each other along the circumferential direction. Even the discharging container according to the present embodiment can achieve the same function and effect as the discharging container according to the first embodiment.

Third Embodiment

Figure 9:
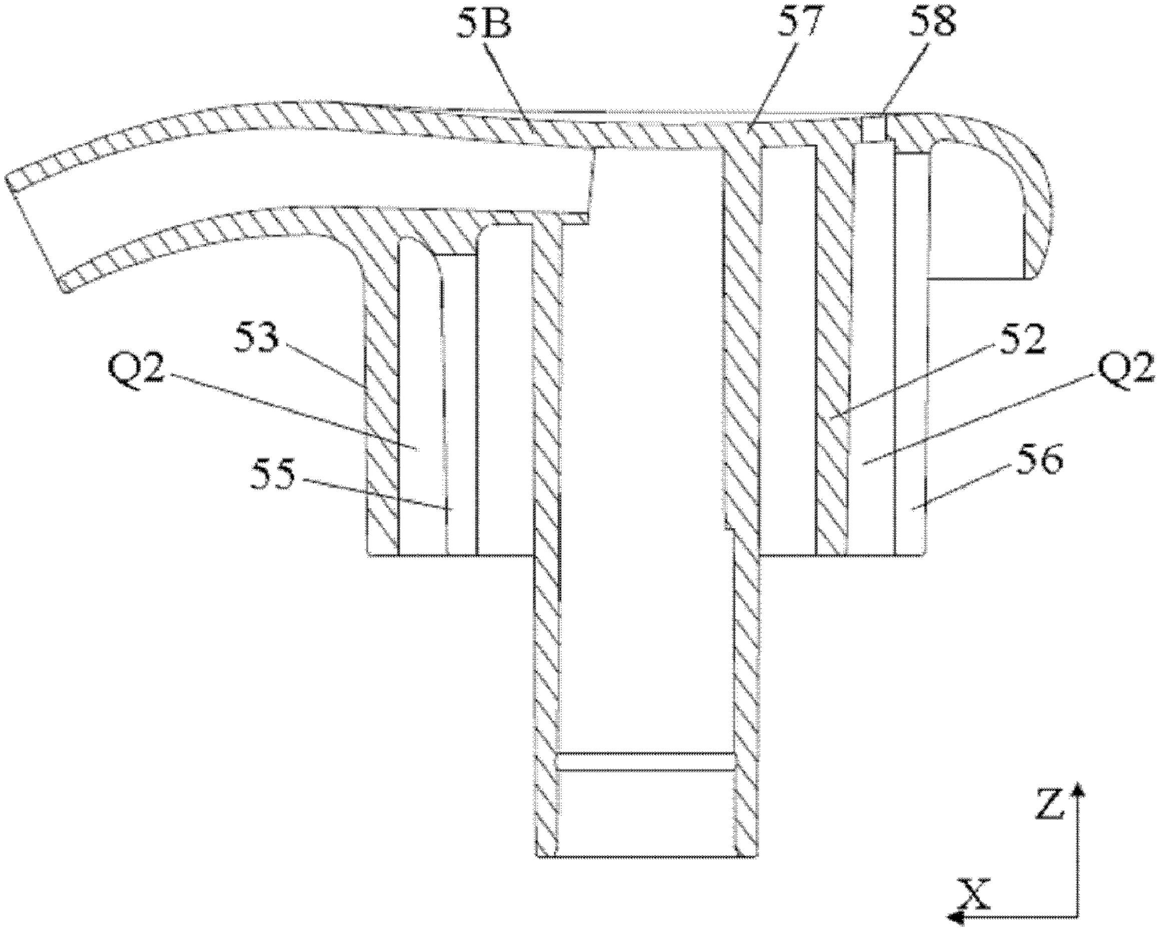
FIG. 9 is a cross-sectional view showing a schematic configuration of a pump head portion of a discharging container according to a third embodiment.
Figure 10:
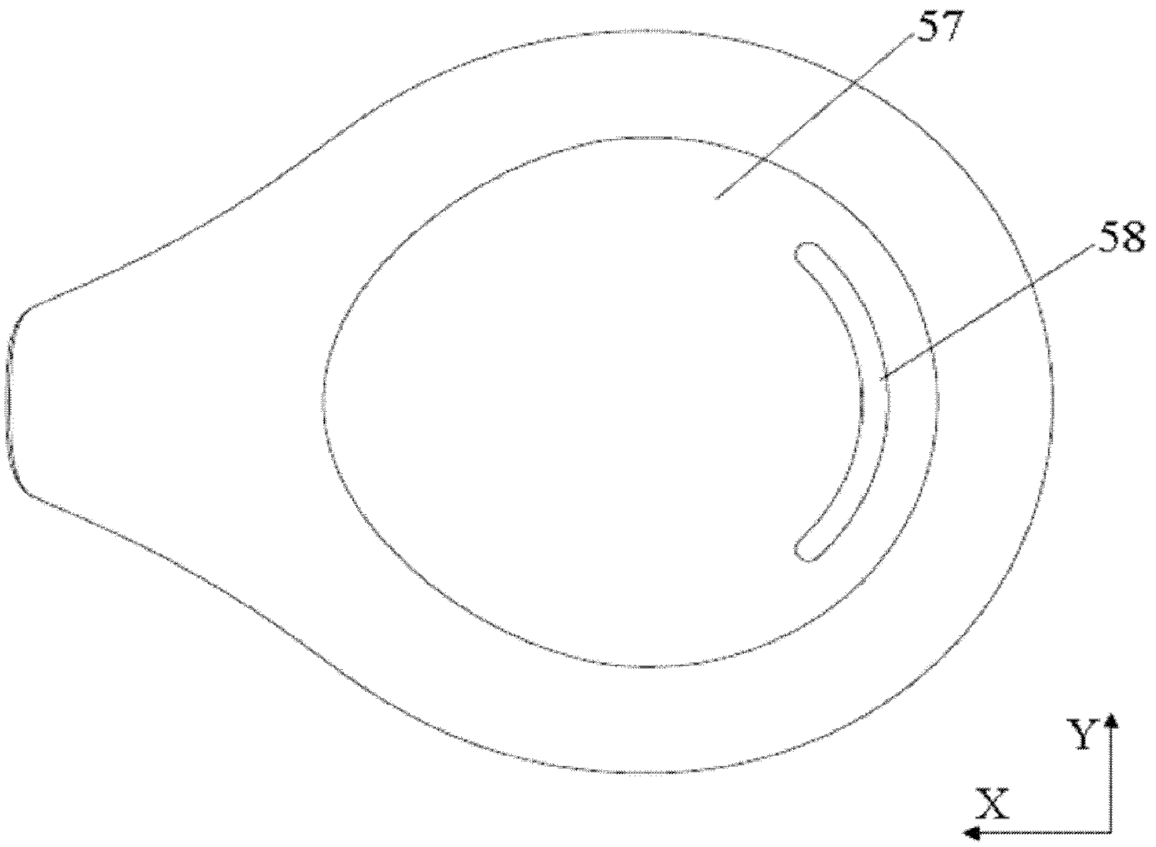
FIG. 10 is a top view showing a schematic configuration of the pump head portion of the discharging container according to the third embodiment.
Figure 11:
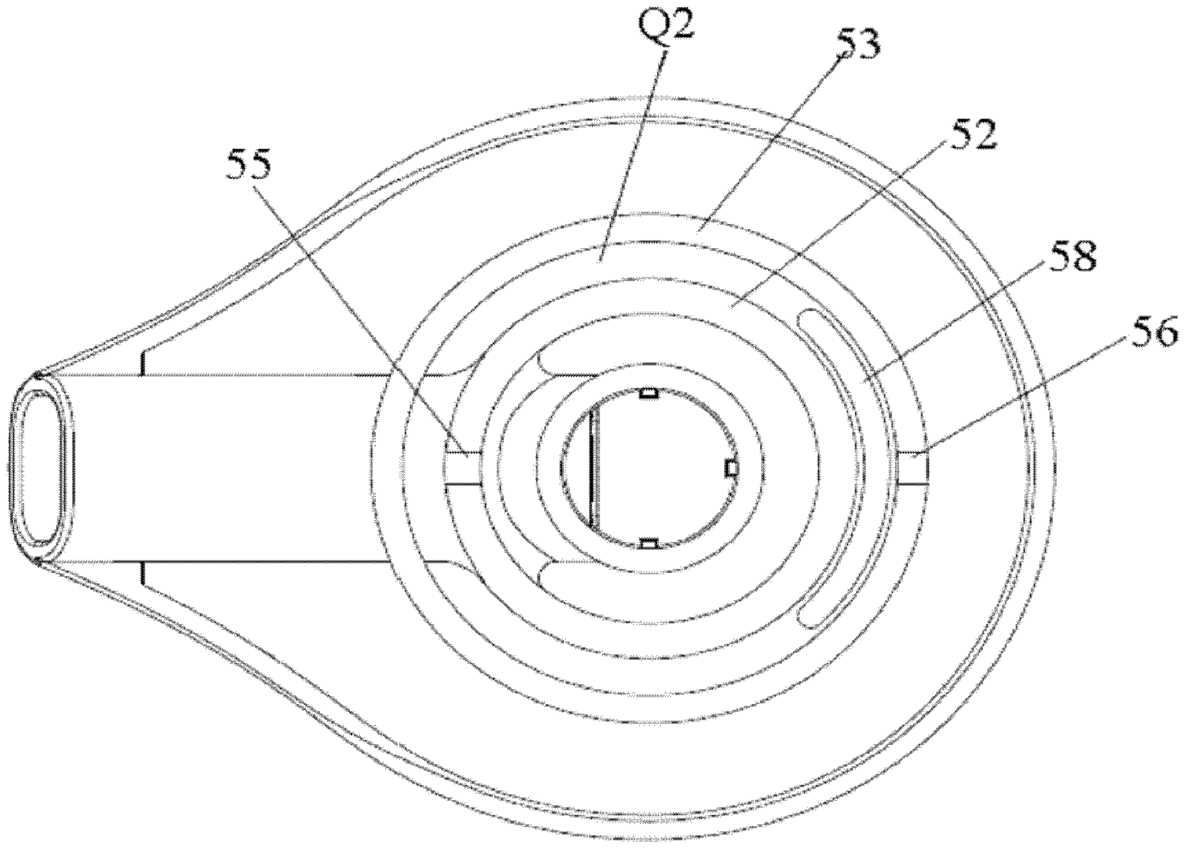
FIG. 11 is a bottom view showing a schematic configuration of the pump head portion of the discharging container according to the third embodiment.

FIG. 9 is a cross-sectional view showing a schematic configuration of a pump head portion of a discharging container according to a third embodiment. FIG. 10 is a top view showing a schematic configuration of the pump head portion of the discharging container according to the third embodiment. FIG. 11 is a bottom view showing a schematic configuration of the pump head portion of the discharging container according to the third embodiment.

The discharging container according to the present embodiment is substantially the same as the discharging container according to the first embodiment except that it includes pump head portion 5B instead of pump head portion 5 as shown in FIGS. 9 to 11. Therefore, in the following, the differences from the discharging container according to the first embodiment will be mainly explained in detail.

Specifically, in the present embodiment, pump head portion 5B has tubular inner tube portion 51 as the first embodiment that is connected to the upper end portion of piston 7 and forms discharge passage C at the inside, and discharge port 54 that is communicated with discharge passage C and discharges the liquid agent. Inner tube portion 51 is inserted into guide rod 4 of cover portion 4. In addition, pump head portion has tubular inner waterproof wall 52 that is located at the outside of inner tube portion 51 and can move up and down (can move back and forth in the Z-axis direction) along the outer peripheral surface of guide rod 43 of cover portion 4, and tubular first outer waterproof wall 53 that is located at the outside of inner waterproof wall 52 and can move up and down (can move back and forth in the Z-axis direction) with inner waterproof wall 52. Inner tube portion 51, inner waterproof wall 52, and first outer waterproof wall 53 are formed coaxially, and inner waterproof wall 52 is provided with first opening 55. Second opening 56 is provided in first outer waterproof wall 53. Furthermore, third opening 58 is provided in top wall 57 of pump head portion 5B in such a way that space Q2 between inner waterproof wall 52 and first outer waterproof wall 53 is communicated with the external air.

In this way, in a state where pump head portion 5B is pressed, inner waterproof wall 52 is opposed to guide rod 43, and space Q1 between inner waterproof wall 52 and guide rod 43 is communicated with space Q2 between inner waterproof wall 52 and first outer waterproof wall 53 via first opening 55 formed in inner waterproof wall 52, which is the same as the first embodiment.

In addition, unlike the first embodiment, space Q2 between inner waterproof wall 52 and first outer waterproof wall 53 is communicated with the external air via second opening 55 formed in first outer waterproof wall 53 and third opening 58 formed in top wall 57 of pump head portion 5B.

In addition, in the present embodiment, as shown in FIG. 10, when viewed along the Z-axis direction, third opening 58 is formed into an arc shape. However, it is not limited to this, and as long as it is easy to demold third opening 58 from the mold during molding, third opening 58 may have any shape.

Even the discharging container according to the present embodiment can achieve the same function and effect as the discharging container according to the first embodiment.

Fourth Embodiment

Figure 12:
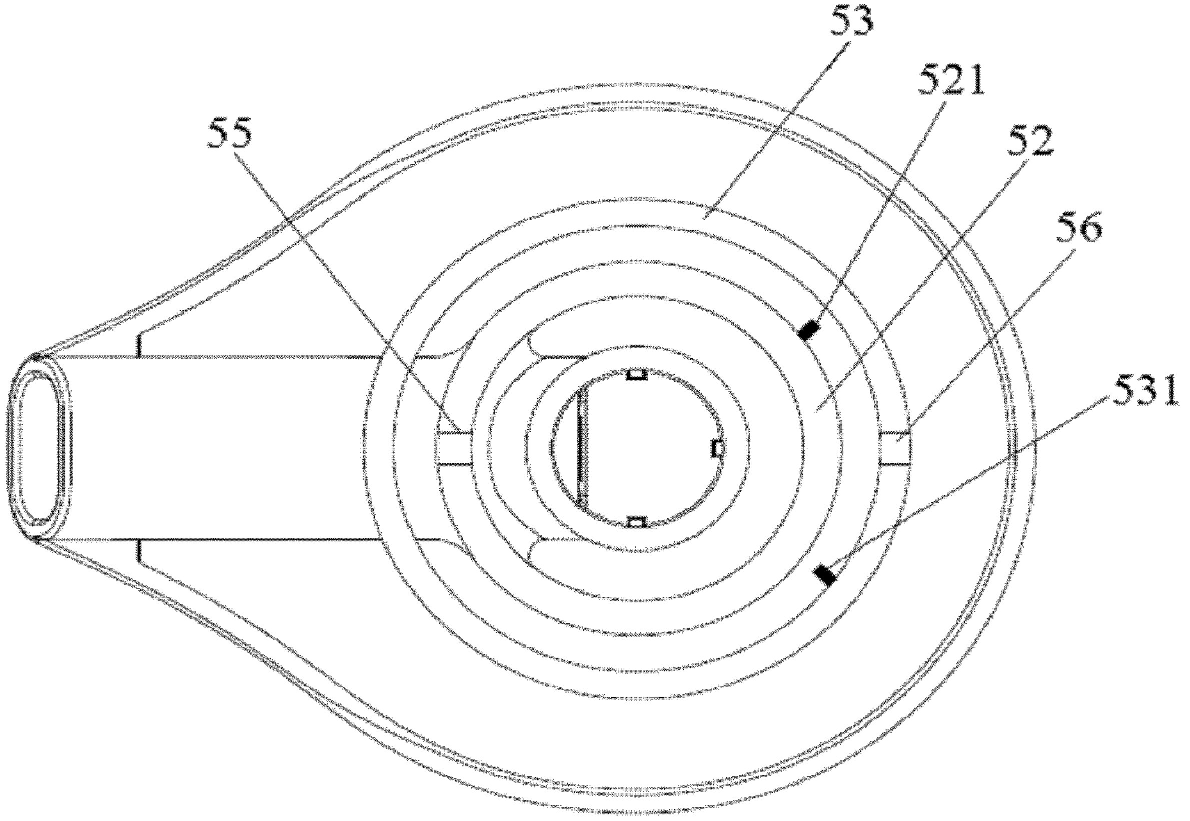
FIG. 12 is a bottom view showing a schematic configuration of a pump head portion of a discharging container according to a fourth embodiment.

FIG. 12 is a bottom view showing a schematic configuration of a pump head portion of a discharging container according to a fourth embodiment.

The discharging container according to the present embodiment is substantially the same as the discharging container according to the first embodiment, except for convex first baffle 521 on the outer peripheral surface of inner waterproof wall 52 and convex second baffle 531 on the inner peripheral surface of first outer waterproof wall 53 as shown in FIG. 12.

Specifically, in the present embodiment, one first baffle 521 is provided on the outer peripheral surface of inner waterproof wall 52, and one second baffle 531 is provided on the inner peripheral surface of first outer waterproof wall 53. However, it is not limited to this. Two or more first baffles 521 may be provided on the outer peripheral surface of inner waterproof wall 52, and two or more second baffles 531 may be provided on the inner peripheral surface of first outer waterproof wall 53.

First baffle 521 and second baffle 531 can be provided to more reliably prevent water intrusion.

Even the discharging container according to the present embodiment can achieve the same function and effect as the discharging container according to the first embodiment.

Fifth Embodiment

Figure 13:
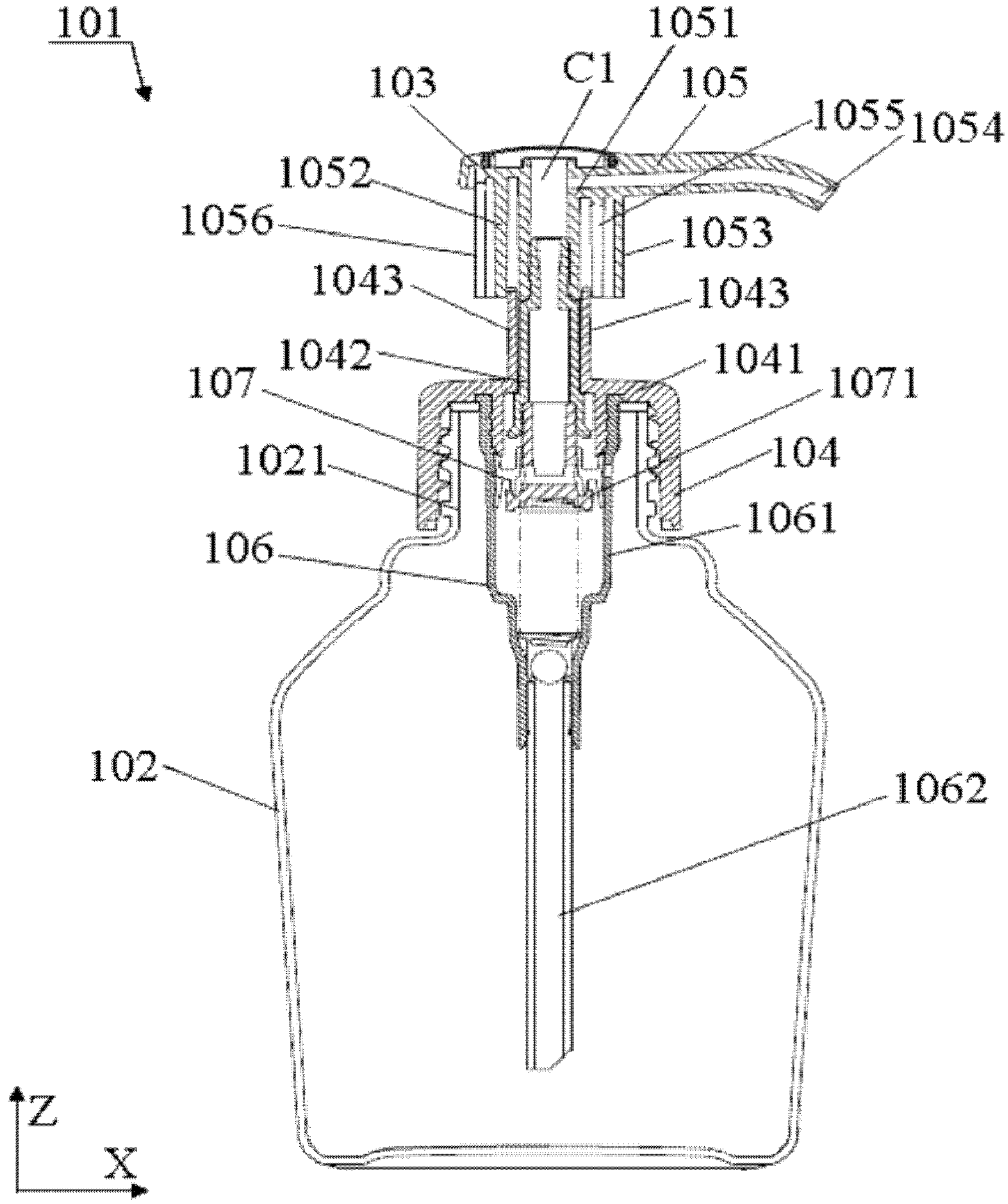
FIG. 13 is a cross-sectional view showing a schematic configuration of a discharging container according to a fifth embodiment when the pressing is released.

FIG. 13 is a cross-sectional view showing a schematic configuration of a discharging container according to a fifth embodiment when the pressing is released.

As shown in FIG. 13, discharging container 101 according to the present embodiment is a discharging container that directly discharges the content, and includes container body 102 storing the content and discharging component 103 mounted to container body 102.

Discharging component 103 includes cover portion 104 mounted to mouth neck portion 1021 of container body 102, pump head portion 105 provided with discharge port 1054 for discharging the content by a pressing operation, cylinder portion 106 that is provided downwardly from mouth neck portion 1021 of container body 102 toward the inside, and piston portion 107 that is freely movable along the Z-axis direction inside cylinder portion 106.

Tubular guide rod 1043 is erected upwards from the periphery of fourth opening 1042 opened in the central portion of top plate 1041 of cover portion 104. Pump head portion 105 is provided with inner tube portion 1051 connected to the upper end portion of piston portion 107 and forming discharge passage Cl at the inside, inner waterproof wall 1052 that is located at the outside of inner tube portion 1051 and can move up and down (that can move back and forth in the Z-axis direction) along the outer peripheral surface of guide rod 1043 of cover portion 104, and first outer waterproof wall 1053 located at the outside of inner waterproof wall 1052. In the present embodiment, inner tube portion 1051, inner waterproof wall 1052, and first outer waterproof wall 1053 are integrally formed in pump head portion 105. However, it is not limited to this. Inner tube portion 1051, inner waterproof wall 1052, and first outer waterproof wall 1053 may be separately formed in pump head portion 105, respectively.

Cylinder portion 106 includes tubular cylinder 1061. A funnel-shaped valve seat portion is formed at the lower end of cylinder 1061, and liquid guiding pipe 1062 for guiding the content contained in container body 102 into cylinder 1061 is connected below the valve seat portion.

Piston portion 107 includes piston 1071 slidable along the inner surface of cylinder 1061. At the lower end of piston 1071, a sealing portion having a predetermined width is formed so as to ensure sufficient airtightness with the inner surface of cylinder 1061 and to smoothly slide in the vertical direction with respect to the inner surface.

In this way, by pressing pump head portion 105, piston 1071 slides downward in conjunction with the downward movement of pump head portion 105, so that the content stored in cylinder 106 is pressurized, and is further discharged from discharge port 1054 through discharge passage Cl in pump head portion 105.

In addition, by releasing the pressing to pump head portion 105, piston 1071 slides upward and returns to the initial position (see FIG. 13).

In addition, in the present embodiment, in a state where pump head portion 105 is pressed, inner waterproof wall 1052 is opposed to guide rod 1043, and the space between inner waterproof wall 1052 and guide rod 1043 is communicated with the space between inner waterproof wall 1052 and first outer waterproof wall 1053 via first opening 1055 formed in inner waterproof wall 1052, the space between inner waterproof wall 1052 and first outer waterproof wall 1053 is communicated with the external air via second opening 1056 formed in first outer waterproof wall 1053.

Therefore, the air pressure in pump head portion 105 including these spaces is equal to the air pressure of the external air. Therefore, when the pressing is released after pump head portion 105 of discharging component 103 is pressed to discharge the content, with the rise of pump head portion 105, the air pressure of the external air will not be greater than the air pressure in pump head portion 105. Even when it is used in, for example, a bathroom, water is directly applied to discharging container 101 during the shower and the water is accumulated in the fitting portion of pump head portion 105 and cover portion 104, it is possible to prevent the water accumulating in the fitting portion and the external air from entering container body 102 through the gap between pump head portion 105 and guide rod 1043 of cover portion 104. In addition, pump head portion 105 is provided with a two-layer waterproof wall consisting of inner waterproof wall 1052 and first outer waterproof wall 1053, and inner waterproof wall 1052 and first outer waterproof wall 1053 are respectively provided with first opening 1055 and second opening 1056. Therefore, it is not difficult to demold the external air intake port from the mold during molding as in the prior art, and it becomes easy to be manufactured the discharging container.

In addition, in the present embodiment, as shown in FIG. 13, first opening 1055 is formed into an elongated shape extending upwards from the lower end edge of inner waterproof wall 1052. However, it is not limited to this, as long as it is easy to demold first opening 1055 from the mold during molding, first opening 1055 may have any shape.

In addition, in the present embodiment, as shown in FIG. 13, second opening 1056 is formed into an elongated shape extending upwards from the lower end edge of first outer waterproof wall 1053. However, it is not limited to this, as long as it is easy to demold second opening 1056 from the mold during molding, second opening 1056 may have any shape.

According to discharging container 101 according to the present embodiment, it is possible to provide a discharging container that is easy to be manufactured and can reliably prevent water intrusion Above, the above-mentioned various embodiments of the present invention have been described. However, the present invention is not limited to the above-mentioned respective embodiments, and various modifications can be made without departing from the gist of the present invention.

For example, in each of the above-mentioned embodiments, each of the first opening, the second opening, and the third opening is formed with only one. However, it is not limited to this, and at least any one of the first opening, the second opening, and the third opening may be formed with two or more. In this case, it is preferable that any one of the first opening, the second opening, and the third opening is provided at a position that does not overlap with the remaining openings along the circumferential direction.

In addition, in each of the above-mentioned embodiments, the first outer waterproof wall is formed with only one layer, but it is not limited to this, and the first outer waterproof wall may be formed with two or more layers.

The invention claimed is:

1. A discharging container, comprising a container body for storing a content and a discharging component that discharges the content, wherein:

the discharging component comprises a cover portion mounted to a mouth neck portion of the container body and a pump head portion that discharges the content by a pressing operation, a tubular guide rod is erected upwards from a periphery of an opening formed in a central portion of a top plate of the cover portion, the pump head portion is provided with an inner waterproof wall capable of moving up and down along an outer peripheral surface of the guide rod, and a first outer waterproof wall located at the outer side of the inner waterproof wall, and in a state that the pump head portion is pressed, the inner waterproof wall is opposed to the guide rod, a space between the inner waterproof wall and the guide rod is communicated with a space between the inner waterproof wall and the first outer waterproof wall via a first opening formed in the inner waterproof wall, and a space between the inner waterproof wall and the first outer waterproof wall is communicated with external air via a second opening formed in the first outer waterproof wall and/or a third opening formed in a top wall of the pump head portion.

2. The discharging container according to claim 1, wherein a lower end edge of the inner waterproof wall and a lower end edge of the first outer waterproof wall are both located at the same position as the position of an upper end edge of the guide rod in a height direction of the discharging container or below the position of an upper end edge of the guide rod in a height direction of the discharging container.

3. The discharging container according to claim 1, wherein at least any one of the first opening, the second opening, and the third opening is formed as two or more openings.

4. The discharging container according to claim 1, wherein when viewed along a height direction of the discharging container, the first opening and the second opening and/or the third opening do not overlap each other in a circumferential direction, respectively.

5. The discharging container according to claim 1, wherein the first opening is formed to extend upwards from a lower end edge of the inner waterproof wall.

6. The discharging container according to claim 1, wherein the first opening has an elongated shape.

7. The discharging container according to claim 1, wherein the second opening is formed to extend upwards from a lower end edge of the first outer waterproof wall.

8. The discharging container according to claim 1, wherein the second opening has an elongated shape.

9. The discharging container according to claim 1, wherein the third opening is formed into an arc shape when viewed along a height direction of the discharging container.

10. The discharging container according to claim 1, wherein a convex first baffle is arranged on an outer peripheral surface of the inner waterproof wall, and a convex second baffle is arranged on an inner peripheral surface of the first outer waterproof wall.

11. The discharging container according to claim 1, wherein the content is a liquid agent, and the discharging container is a foam discharging container that mixes the liquid agent with air to discharge a foamy liquid agent.

12. The discharging container according to claim 2, wherein when viewed along the height direction of the discharging container, the first opening and the second opening and/or the third opening do not overlap each other in a circumferential direction, respectively.

13. The discharging container according to claim 2, wherein the first opening is formed to extend upwards from the lower end edge of the inner waterproof wall.

14. The discharging container according to claim 2, wherein the first opening has an elongated shape.

15. The discharging container according to claim 2, wherein the second opening is formed to extend upwards from the lower end edge of the first outer waterproof wall.

16. The discharging container according to claim 2, wherein the second opening has an elongated shape.

17. The discharging container according to claim 2, wherein the third opening is formed into an arc shape when viewed along the height direction of the discharging container.

18. The discharging container according to claim 2, wherein a convex first baffle is arranged on an outer peripheral surface of the inner waterproof wall, and a convex second baffle is arranged on an inner peripheral surface of the first outer waterproof wall.

19. The discharging container according to claim 2, wherein the content is a liquid agent, and the discharging container is a foam discharging container that mixes the liquid agent with air to discharge a foamy liquid agent.

* * * * *